(12) United States Patent
Kirihara et al.

(10) Patent No.: US 8,498,003 B2
(45) Date of Patent: Jul. 30, 2013

(54) JOB LOG CONTROL METHOD, COMPUTER READABLE MEDIUM FOR THE SAME, IMAGE PROCESSING DEVICE, AND IMAGE PROCESSING SYSTEM

(75) Inventors: Kazuko Kirihara, Kanagawa (JP); Masafumi Ono, Kanagawa (JP); Toshiaki Arai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1143 days.

(21) Appl. No.: 11/485,372

(22) Filed: Jul. 13, 2006

(65) Prior Publication Data

US 2007/0135930 A1 Jun. 14, 2007

(30) Foreign Application Priority Data

Dec. 13, 2005 (JP) ................................. 2005-359209

(51) Int. Cl.
*G06F 3/12* (2006.01)

(52) U.S. Cl.
USPC ......... 358/1.15; 358/1.13; 358/1.14; 358/1.2; 358/1.16

(58) Field of Classification Search
USPC ................ 358/1.1–1.16, 504, 1.13–1.16, 1.2
See application file for complete search history.

(56) References Cited

U.S. PATENT DOCUMENTS

| | | | | |
|---|---|---|---|---|
| 4,819,154 A | * | 4/1989 | Stiffler et al. | 714/20 |
| 6,134,017 A | | 10/2000 | Schlank et al. | |
| 6,633,413 B1 | * | 10/2003 | Schlank et al. | 358/468 |
| 6,728,751 B1 | * | 4/2004 | Cato et al. | 709/202 |
| 6,826,534 B1 | * | 11/2004 | Gupta et al. | 705/8 |
| 6,947,182 B1 | * | 9/2005 | Kumagai | 358/402 |
| 2003/0234957 A1 | * | 12/2003 | Ohara | 358/1.15 |
| 2004/0047010 A1 | * | 3/2004 | Suenaga et al. | 358/504 |
| 2004/0190039 A1 | * | 9/2004 | Lay et al. | 358/1.14 |
| 2006/0001907 A1 | | 1/2006 | Kumagai | |
| 2006/0085697 A1 | | 4/2006 | Takeuchi et al. | |
| 2006/0170705 A1 | * | 8/2006 | Wilson | 345/628 |
| 2006/0294154 A1 | | 12/2006 | Shimizu | |
| 2007/0133037 A1 | | 6/2007 | Arai et al. | |
| 2007/0143361 A1 | | 6/2007 | Arai et al. | |

FOREIGN PATENT DOCUMENTS

| | | |
|---|---|---|
| JP | 08-307702 A | 11/1996 |
| JP | 09-214661 A | 8/1997 |
| JP | 10-187364 A | 7/1998 |
| JP | 2000-250621 A | 9/2000 |
| JP | 2001-103232 A | 4/2001 |
| JP | 2003-330677 A | 11/2003 |
| JP | A-2004-078638 | 3/2004 |

(Continued)

OTHER PUBLICATIONS

Office Action issued in JP Application No. 2005-359209 on Jan. 11, 2011 (with English translation).

(Continued)

*Primary Examiner* — Benny Q Tieu
*Assistant Examiner* — Michael Y Tzeng
(74) *Attorney, Agent, or Firm* — Oliff & Berridge, PLC (57) ABSTRACT

According to an aspect of the invention, there is provided a storage medium readable by a computer, the storage medium storing a program of instructions executable by the computer to perform a function for controlling a job log, comprising: generating a job log after execution of a job; creating a log image from an image handled in the job; and performing transfer of the job log and the log image to an external device with predetermined timing.

27 Claims, 6 Drawing Sheets

(FIRST EMBODIMENT)

FOREIGN PATENT DOCUMENTS

| | | |
|---|---|---|
| JP | A-2004-078938 | 3/2004 |
| JP | A-2004-086691 | 3/2004 |
| JP | 2004-110634 A | 4/2004 |
| JP | A-2004-102549 | 4/2004 |
| JP | A 2004-192273 | 7/2004 |
| JP | 2004-288038 A | 10/2004 |
| JP | 3701523 B | 7/2005 |
| JP | 2006-107217 A | 4/2006 |
| JP | A-2006-197230 | 7/2006 |
| JP | 2006-330791 A | 12/2006 |
| JP | 2007-004453 A | 1/2007 |
| JP | 2007-068100 A | 3/2007 |
| JP | 2007-166175 A | 6/2007 |
| JP | 2007-166177 A | 6/2007 |
| JP | 2007-166179 A | 6/2007 |
| JP | B2-4194597 | 10/2008 |
| JP | B2-4264568 | 2/2009 |

OTHER PUBLICATIONS

Japanese Office Action dated Oct. 19, 2010 issued in corresponding Japanese Patent Application No. JP 2005-359209.

* cited by examiner

FIG. 1
(FIRST EMBODIMENT)

FIG. 2
(FIRST EMBODIMENT)

FIG. 3
(FIRST EMBODIMENT)

JOB LOG CONTROL METHOD, COMPUTER READABLE MEDIUM FOR THE SAME, IMAGE PROCESSING DEVICE, AND IMAGE PROCESSING SYSTEM

CROSS-REFERENCE TO RELATED APPLICATIONS

This application is based on and claims the benefit of priority from the prior Japanese Patent Application No. 2005-359209, filed on Dec. 13, 2005; the entire contents of which are incorporated herein by reference.

BACKGROUND

1. Technical Field

The present invention relates to a job log control method, computer readable medium for a job log control, an image processing device, and an image processing system for controlling a job such as copying, printing, scanning, faxing as a job log (an executive logging of the job) after executing the job.

2. Description of Related Art

A printing system including a plurality of clients and a printer connected to a local area network (LAN) and allowing a plurality of users to use the printer in common has been known.

SUMMARY

According to an aspect of the invention, there is provided a storage medium readable by a computer, the storage medium storing a program of instructions executable by the computer to perform a function for controlling a job log, comprising: generating a job log after execution of a job; creating a log image from an image handled in the job; and performing transfer of the job log and the log image to an external device with predetermined timing.

BRIEF DESCRIPTION OF DRAWINGS

Exemplary embodiment(s) of the present invention will be described in detail based on the following figures, wherein.

DESCRIPTION OF EXEMPLARY EMBODIMENTS

First Exemplary Embodiment

Figure 1:
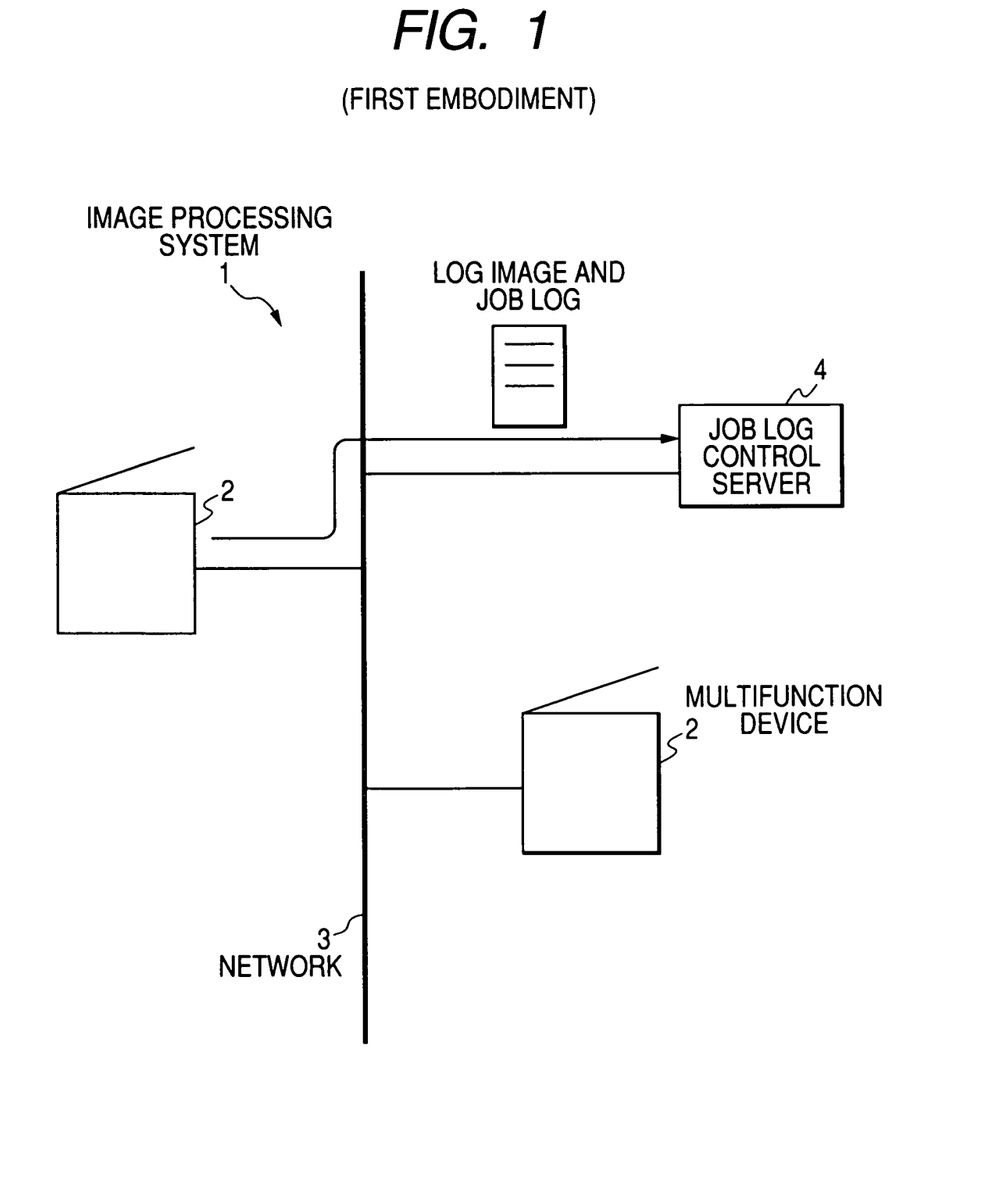
FIG. 1 is a configuration diagram for showing an image processing system according to a first exemplary embodiment of the invention.

FIG. 1 shows an image processing system according to a first exemplary embodiment of the invention. The image processing system 1 is provided with multifunction devices 2, as a plurality of image processing devices for generating a job log in accordance with execution of the job and creating a log image from the image handled by the job, and a job log control server 4 for storing the job log and the log image transferred from each of the multifunction devices 2 via a network 3 as a communication line.

Figure 2:
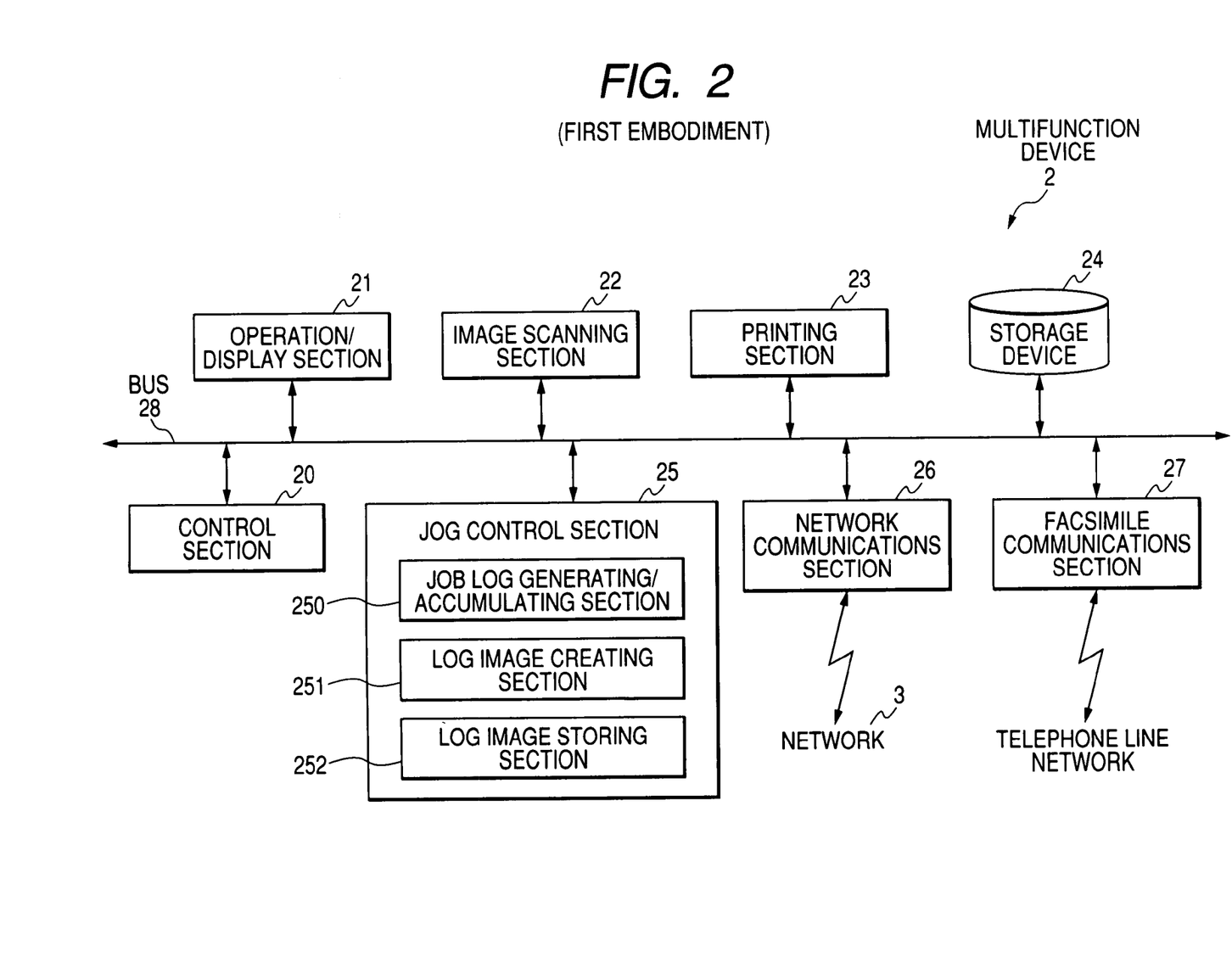
FIG. 2 is a block diagram of a multifunction device according to the first exemplary embodiment.

FIG. 2 is a block diagram of the multifunction device 2. The multifunction device 2 includes a control section 20 equipped with a CPU, a ROM, a RAM, and so on, and for controlling every section of the multifunction device 2, an operation/display section 21 provided with a touch panel-display composed of a display and a touch panel stacked on the surface of the display and a hard key such as a start key, an image scanning section 22 for optically scanning a document to read out the image, a printing section 23 for printing an image on a sheet by, for example, an electrophotographic method, a storage device 24 composed of an HDD and so on for storing various information such as a setting screen, setting information or images, a job control section 25 for issuing a job ID in response to reception of a job and generating a job log and so on after the job has been executed, a network communications section 26 connected to the network 3, and a facsimile communications section 27 connected to the telephone line network or the like, all connected to each other via a bus 28.

The multifunction device 2 has plural functions such as copying (duplicating), printing, scanning, faxing, and e-mailing. A job processes an image using one or more of these functions. A job is accepted by the operation/display section 21, or can be accepted from a user terminal (not shown), which is connected to the network 3 and composed of a personal computer and so on.

In the ROM of the control section 20, there are stored various programs such as a job execution program, a job log control program, or a transfer protocol such as the hypertext transfer protocol (HTTP) or the hypertext transfer protocol security (HTTPS). The CPU of the control section 20 controls every section of the multifunction device 2 and detects transfer timing of the job logs and the log images described later in accordance with the programs stored in the ROM. Note that a sensor can be used for detecting the transfer timing if necessary.

The operation/display section 21 is arranged to be able to set the transfer timing of the job logs and the log images to the control server 4. Namely, the setting of the transfer timing may be performed by selecting the transfer timing from the following alternatives on the administrator setting screen displayed on the display of the operation/display section 212 in the administrator setting mode:

(a) on completion of the job;
(b) on acceptance of a manual instruction for transfer by the administrator;
(c) during a load of the image processing device itself is light;

As such a case, the setting may be made by selecting one from the following alternatives:

(i) on detection of no job execution for a predetermined period;
(ii) on powering on;
(iii) on entering the sleep mode;
(iv) on coming of a specified time zone such as nighttime;
(v) on acceptance of an instruction from an external terminal (a user terminal);
(vi) on elapse of a specified period such as a period from powered-on to execution of a predetermined operation; and
(vii) On detection of the transfer ready condition,
(d) when the possibility of missing the log image becomes high;

As such a case, the setting may be made by selecting one from the following alternatives:

(i) when a predetermined number of job logs or a predetermined number of log images is accumulated;
(ii) on detection of "disk near full," namely when it is detected that the storage capacity used for storing the log images and the job logs reaches a predetermined value; and
(iii) on execution of an operation for deleting the log image and the job log.

Note that the transfer timing during a load of the image processing device itself is light, and the transfer timing when the possibility of missing the log image becomes high are not limited to the above cases. Further, the transfer timing of (a) through (c) are not limited to the above cases.

The job control section 25 may include a job log generating/accumulating section 250 for generating a job log after execution of the job and then accumulating them, a log image creating section 251 for creating a log image from the image handled in the job, and a log image storing section 252 for storing the log image associated with the job log, and operates under control of the CPU of the control section 20.

The job log may include, for example, the multifunction ID, the job ID, the job type, a user name, the job reception time, the job finish time, and the job status information such as waiting, processing, suspended, or completed.

The log image creating section 251 executes the process on the image handled by the job in accordance with log image creation setting information stored in the storage device 24 to create the log image. The log image creation setting information may include, for example, resolution of the log image, or designation of a page handled for the log image creation in the case in which the image is composed of plural pages. The log image creating section 251 creates a reduced image as the log image by lowering the resolution of the image handled by the job if the resolution is thus set, or uses the designated page as the log image if the page is designated.

Figure 3:
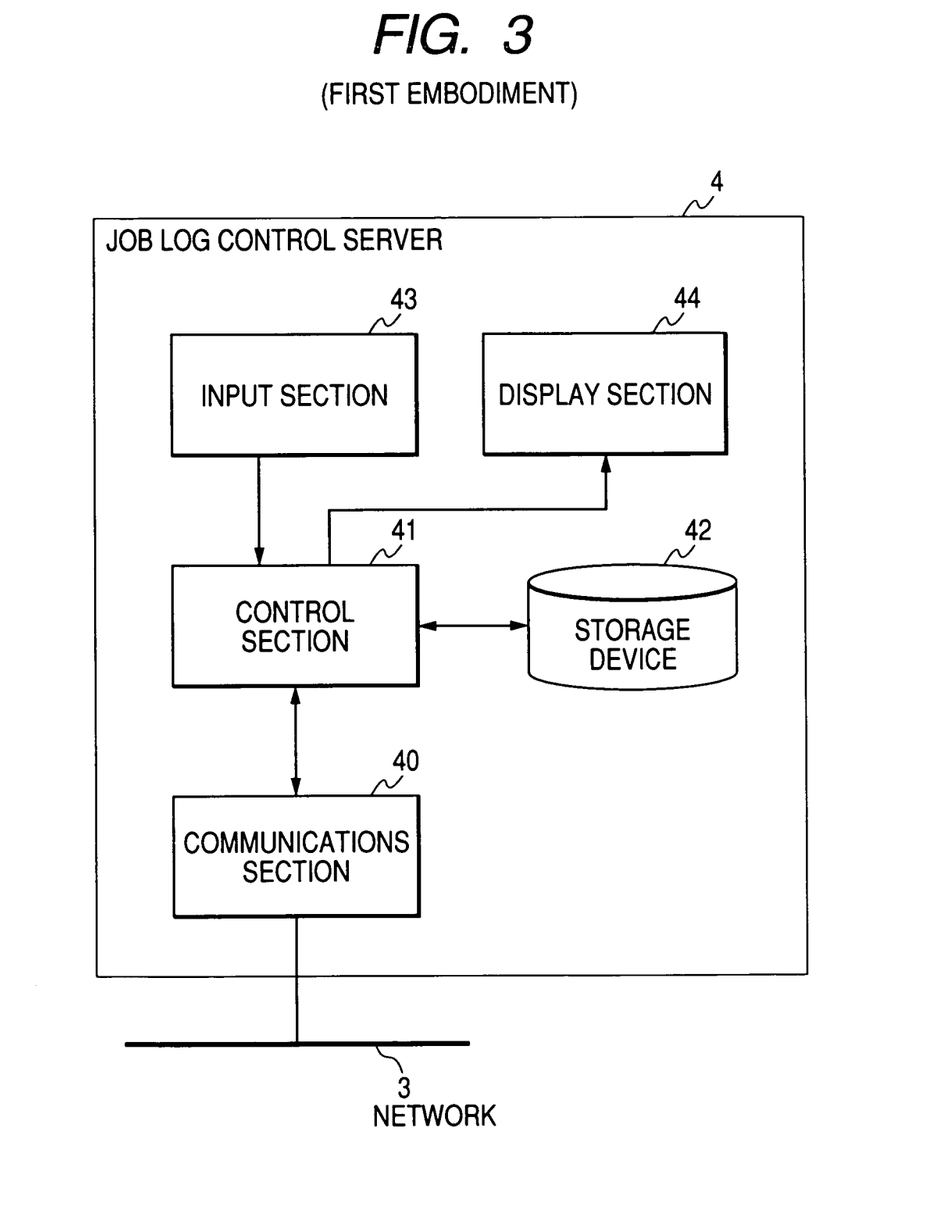
FIG. 3 is a block diagram of a job log control server according to the first exemplary embodiment.

FIG. 3 is a block diagram of the job log control server 4. The job log control server 4 includes a communications section 40 connected to the network 3, a control section 41 equipped with a CPU, a ROM, a RAM, and so on, and for controlling every section of this server 4, a storage device 42 composed of an HDD and so on, an input section 43 provided with a keyboard, a mouse, and so on, and a display section 44 for displaying a setting screen and so on, and can be realized with a personal computer.

In the ROM of the control section 41, there are stored various kinds of programs, and the CPU of the control section 41 controls every section of the job log control server 4 in accordance with the programs stored in the ROM.

The storage device 42 is for storing the log images and job logs transferred from each of the multifunction devices 2, the setting screen and so on, and the log images are stored associated with the respective job logs.

Operation of First Exemplary Embodiment

The operation of the present exemplary embodiment will now be explained dividing into cases.

1. Setting by Administrator

The administrator of either of the system 1 or the multifunction device 2 inputs the password by operating the operation/display section 21 of the multifunction device 2, and when the administrator is identified as the true administrator, the mode is switched to the administrator setting mode. The administrator selects "log image transfer timing setting" button on the menu screen to make the operation/display section 21 display the log image transfer timing setting screen not shown in the drawings.

The administrator selects the log image transfer timing from the alternatives on the log image transfer timing setting screen and then holds down "confirmation/alteration" button. After then, when the administrator holds down "close" button to close the log image transfer timing setting screen, the contents set on the log image transfer timing setting screen are fixed. The control section 20 stores the fixed log image transfer timing setting information in the storage device 24, and makes transition from the administrator setting mode to the normal mode.

2. Generation of Job Log and Creation of Log Image

When the user operates the operation/display section 21 of the multifunction device 2 to set the job and gives an instruction for executing the job, the control section 20 controls every section of the multifunction device to perform the job. The job control section 25 issues multifunction device ID and job ID in response to commencement of the job, and controls the job based on the multifunction device ID and the job ID. Note that the setting of the job and the instruction for job execution can be performed from a user terminal connected to the network 3.

The job log generating/accumulating section 250 of the job control section 25 generates and then accumulates the job log after the job has been executed. The log image creating section 251 executes the image processing on the image handled by the job in accordance with log image creation setting information stored in the storage device 24 to create the log image.

3. Transfer of Job Log and Log Image

The control section 20, when detecting the transfer timing set on the log image transfer timing setting screen, transfers the job logs and the log images to the job log control server 4 via the network communications section 26 and the network 3 using a transfer protocol such as HTTP. The control section 41 of the job log control server 4 receives the job logs and the log images transferred from the multifunction device 2 by the communications section 40, and stores the job logs and the log images in the storage device 42 so that the log images are associated with the respective job logs. The job logs and the log images can be stored so as to be associated with each other, by, for example, storing each of the job logs and the log images associated with the multifunction device ID and the job ID. The job logs and the log images are provided to the administrator for controlling the jobs.

Second Exemplary Embodiment

An image processing system according to a second exemplary embodiment of the invention will now be explained. The multifunction device according to the second exemplary embodiment is arranged to perform an image output operation after transferring the log image, and has the same configuration as the first exemplary embodiment except this point. Since the configuration diagram of the system 1 and the block diagram of the multifunction device 2 are both the same as those of the first exemplary embodiment, the graphic representations therefor are omitted here.

Figure 4:
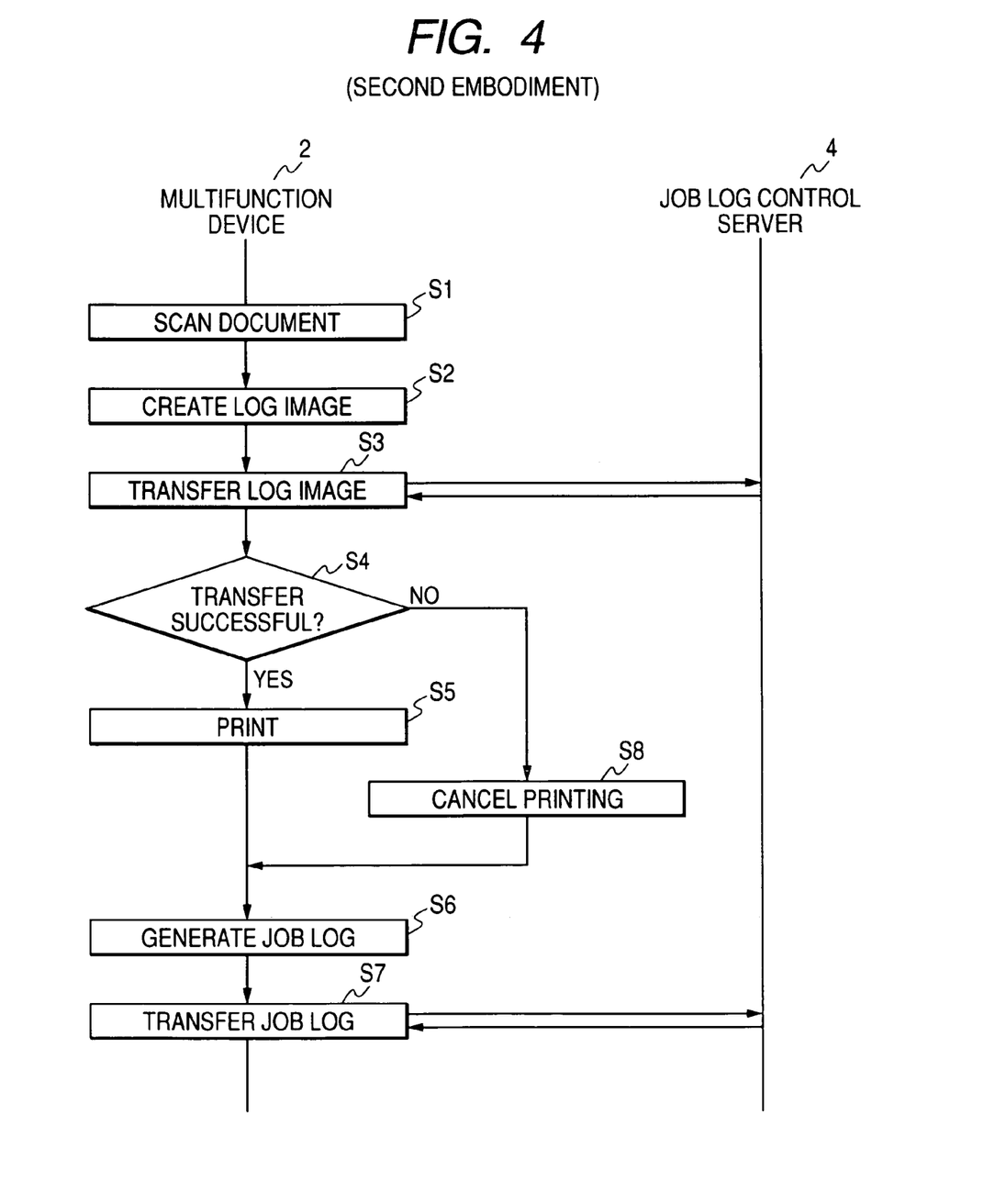
FIG. 4 is a flowchart for showing the operation of an image processing system according to a second exemplary embodiment of the invention in the case of a copy job.
Figure 5:
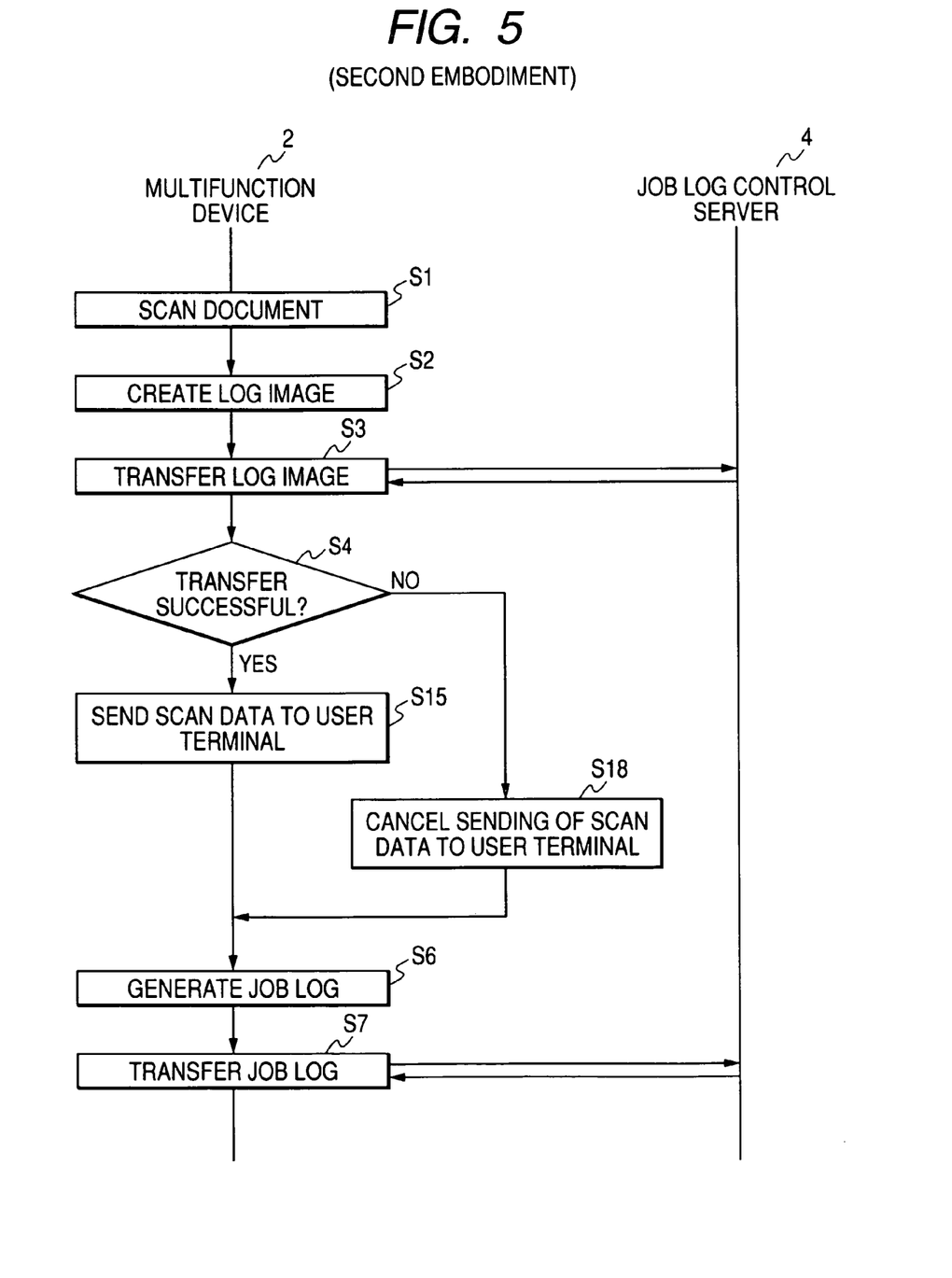
FIG. 5 is a flowchart for showing the operation of the image processing system according to the second exemplary embodiment in the case of a scan job.
Figure 6:
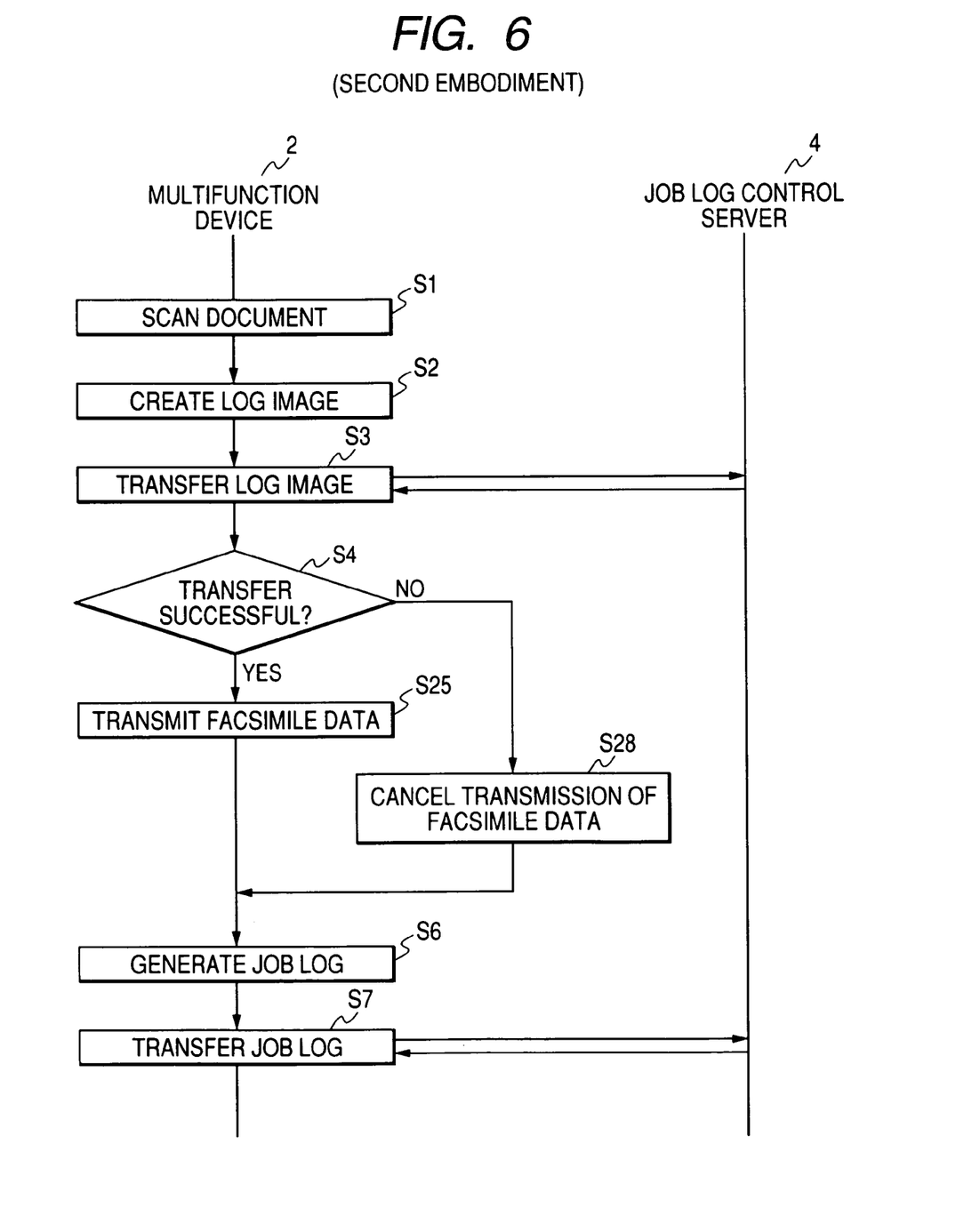
FIG. 6 is a flowchart for showing the operation of the image processing system according to the second exemplary embodiment in the case of a facsimile job.

FIGS. 4 through 6 show the operation of the image processing system according to the second exemplary embodiment of the invention, wherein FIG. 4 is a flowchart of a copy job, FIG. 5 is a flowchart of a scan job, and FIG. 6 is a flowchart of a facsimile transmission job.

1. Copy (Print) Job Case (See FIG. 4)

The user sets the document on a document bed (not shown) or an ADF, selects copying as the job from the main menu, sets the detailed settings for the copy job such as the sheet size or the number of copies by operating the operation/display section 21 of the multifunction device 2, and pushes the start key of the operation/display section 21 to make the image scanning section 22 read the document (S1).

The job control section 25 issues multifunction device ID and job ID in response to commencement of the scanning, and controls the copy job based on the multifunction device ID and the job ID.

The image scanning section 22 scans the document image from the document and stores it in the storage device 24 under the control of the control section 20.

The log image creating section 251 of the job control section 25 creates the log image from the document image in accordance with the log image creation setting information stored in the storage device 24, and temporally stores it in the storage device 24 (S2).

Subsequently, the control section 20 transfers the log image from the storage device 24 to the job log server 4 in conjunction with the multifunction device ID and the job ID via the network communications section 26 and the network 3 (S3).

The control section 41 of the job log control server 4 receives the multifunction device ID, the job ID, and the log image transferred from the multifunction device 2 by the communications section 40, and stores the multifunction device ID, the job ID, and the log image in the storage device 42 so as to be associated with each other.

The control section 20 judges whether or not the transfer of the log image is successful by communication with the job log control server 4 (S4).

If the transfer of the log image is successful (Yes in S4), the control section 20 reads out the document image from the storage device 24, and outputs it to the printing section 23. The printing section 23 prints the document image on paper and outputs the paper (S5).

The job log generating/accumulating section 250 of the job control section 25 generates and then accumulates the job log after the job has been executed (S6). The job log contains the type of the job (copying, in this case), the job acceptance time, the job termination time, the status information (completed, in this case), and so on in accordance with the multifunction device ID and the job ID, which have already been issued.

The control section 20 reads out the job log, which corresponds to the multifunction device ID and the job ID transferred in conjunction with the log image in the step S3 described above, from the job log generating/accumulating section 250, and transfers it to the job log control server 4 via the network communications section 26 and the network 3 (S7).

The control section 41 of the job log control server 4 receives the job log transferred from the multifunction device 2 by the communications section 40, and stores the job log in the storage device 42 so as to be associated with the multifunction device ID and the job ID. In the storage device 42, there are stored the job lob and the log image associated with each other.

If the transfer of the log image is failed in the step S4 (No in S4), the control section 20 cancels the print job (S8).

2. Scan Job Case (See FIG. 5)

The user sets the document on a document bed (not shown) or an ADF, selects scanning as the job from the main menu by operating the operation/display section 21 of the multifunction device 2, inputs user ID in the operation/display section 21, and holds down the start key to make the image scanning section 22 read the document (SCAN DOCUMENT) (S1).

The job control section 25 issues multifunction device ID and job ID in response to commencement of the scanning, and controls the scan job based on the multifunction device ID and the job ID.

The image scanning section 22 scans the document image from the document and stores it in a personal private box corresponding to the user ID in the storage device 24 under the control of the control section 20.

The log image creating section 251 of the job control section 25 creates the log image from the document image in accordance with the log image creation setting information stored in the storage device 24, and temporally stores it in the storage device 24 (S2).

Subsequently, the control section 20 transfers the log image from the storage device 24 to the job log server 4 in conjunction with the multifunction device ID and the job ID via the network communications section 26 and the network 3 (S3).

The control section 41 of the job log control server 4 receives the multifunction device ID, the job ID, and the log image transferred from the multifunction device 2 by the communications section 40, and stores the multifunction device ID, the job ID, and the log image in the storage device 42 so as to be associated with each other.

The control section 20 judges whether or not the transfer of the log image is successful by communication with the job log control server 4 (S4).

If the transfer of the log image is successful (Yes in S4), and the user inputs the user ID and a password using the user terminal such as a PC, the control section 20, after certifying the user from the input user ID and the password, reads out the document image (the scan data) form the personal private box in the storage device 24 and sends it to the user terminal via the network 3 (S15).

The job log generating/accumulating section 250 of the job control section 25 generates and then accumulates the job log after the job has been executed (S6). The job log contains the type of the job (scanning, in this case), the job acceptance time, the job termination time, the status information (completed, in this case), and so on in accordance with the multifunction device ID and the job ID, which have already been The control section 20 reads out the job log, which corresponds to the multifunction device ID and the job ID transferred in conjunction with the log image in the step S3 described above, from the job log generating/accumulating section 250, and transfers it to the job log control server 4 via the network communications section 26 and the network 3 (S7).

The control section 41 of the job log control server 4 receives the job log transferred from the multifunction device 2 by the communications section 40, and stores the job log in the storage device 42 so as to be associated with the multifunction device ID and the job ID. In the storage device 42, there are stored the job lob and the log image associated with each other.

If the transfer of the log image is failed in the step S4 (No in S4), the control section 20 cancels sending of the scan data to the user terminal (S18).

3. Facsimile Transmission Job Case (See FIG. 6)

The user sets the document on a document bed (not shown) or an ADF, selects facsimile as the job from the main menu, selects the destination from the list of facsimile numbers displayed on the operation/display section 21 by operating the operation/display section 21 of the multifunction device 2, and holds down the start key of the operation/display section 21 to make the image scanning section 22 read the document (SCAN DOCUMENT) (S1).

The job control section 25 issues multifunction device ID and job ID in response to commencement of the scanning, and controls the facsimile transmission job based on the multifunction device ID and the job ID.

The image scanning section 22 scans the document image from the document and stores it in the storage device 24 under the control of the control section 20.

The log image creating section 251 of the job control section 25 creates the log image from the document image in accordance with the log image creation setting information stored in the storage device 24, and temporally stores it in the storage device 24 (S2).

Subsequently, the control section 20 transfers the log image from the storage device 24 to the job log server 4 in conjunction with the multifunction device ID and the job ID via the network communications section 26 and the network 3 (S3).

The control section 41 of the job log control server 4 receives the multifunction device ID, the job ID, and the log image transferred from the multifunction device 2 by the communications section 40, and stores the multifunction device ID, the job ID, and the log image in the storage device 42 so as to be associated with each other.

The control section 20 judges whether or not the transfer of the log image is successful by communication with the job log control server 4 (S4).

If the transfer of the log image is successful (Yes in S4), the control section 20 reads out the document image from the storage device 24 to convert it into facsimile data, and performs transmission of the facsimile data (S25).

The job log generating/accumulating section 250 of the job control section 25 generates and then accumulates the job log after the job has been executed (S6). The job log contains the type of the job (facsimile, in this case), the job acceptance time, the job termination time, the status information (completed, in this case), and so on in accordance with the multifunction device ID and the job ID, which have already been issued.

The control section 20 reads out the job log, which corresponds to the multifunction device ID and the job ID transferred in conjunction with the log image in the step S3 described above, from the job log generating/accumulating section 250, and transfers it to the job log control server 4 via the network communications section 26 and the network 3 (S7).

The control section 41 of the job log control server 4 receives the job log transferred from the multifunction device 2 by the communications section 40, and stores the job log in the storage device 42 so as to be associated with the multifunction device ID and the job ID. In the storage device 42, there are stored the job lob and the log image associated with each other.

If the transfer of the log image is failed in the step S4 (No in S4), the control section 20 cancels the transmission of the facsimile data (S28).

Note that in the second exemplary embodiment, copying, scanning, and faxing are explained as the jobs, the above can similarly be applied to other jobs as well.

Other Exemplary Embodiments

Note that the invention is not limited to each the exemplary embodiments described above, but can be put into practice in variously modified forms within the scope or the spirit of the invention. Further, the elements of each of the exemplary embodiments can be combined as desired within the scope or the spirits of the invention.

For example, it is possible that log image creation conditions are set to the server 4, and each of the multifunction devices creates the log image in accordance with the log image creation conditions.

Further, it is also possible that, by making the image scanning section optically read an instruction form with job content and the log image creation conditions written thereon, and the log image creating section creates the log image based hereon.

Further, although in each of the exemplary embodiments described above, the job log and the log image are transferred to the control server, they can be transferred to an external storage device as well. Still further, the job logs and the log images can be transferred in respective devices different from each other.

Further, it is possible to create a thumbnail image composed of a plurality of log images.

According to the exemplary embodiments, the transfer may be performed on completion of the job as the predetermined timing.

According to the exemplary embodiments, the transfer may also be performed on acceptance of a manual transfer instruction as the predetermined timing.

According to the exemplary embodiments, as the predetermined timing, the transfer may be performed in a condition in which a load of an image processing device itself is light. The condition can include one of on detection of no job execution for a predetermined period, on powering on, and on entering a sleep mode.

According to the exemplary embodiments, as the predetermined timing, the transfer may be performed in a condition in which the possibility of missing the log image becomes high. The condition may include one of on accumulation of a predetermined number of job logs or a predetermined number of log images, when it is detected that the storage capacity used for storing the log images and the job logs reaches a predetermined value, and on execution of an operation for deleting the log image and the job log.

The job includes not only a single job but also a job flow including a plurality of jobs. Since a common image is used by the plurality of jobs in the job flow, the log image is created from the common image. Further, an image being used by the job or an image after use of the job is included in "an image handled in the job" described above. Still further, the external device can include a control server for controlling one or more of image processing devices, an external storage device, and so on.

The output manner in accordance with the job denotes, for example, to print the image on paper if the job is copying. If the job is scanning (to transfer the scan data to a personal computer (PC)), it denotes to output the scan data to the PC. And, if the job is facsimile transmission, it denotes to start transmission of the facsimile data to the other machine.

The image processing device may include a single function device such as a copy machine, a printer, a scanner, a facsimile machine, and so on, a multifunction device including functions of copying, printing, scanning, faxing, and so on, and a system composed of a copy machine, a printer, a scanner, a facsimile machine, and so on.

What is claimed is:

1. A non-transitory computer readable storage medium, the storage medium storing a program of instructions executable by the computer to perform a function for controlling a job log of an image processing device, the function comprising:
   inputting an image according to a content of a job;
   issuing a job identifier which corresponds to the job;
   creating a log image by lowering a resolution of the image according to the job;
   transferring the log image and the job identifier to an external device;
   judging whether the transfer of the log image and the job identifier to the external device has succeeded;
   outputting the image in an outputting state according to the job when the transfer of the log image and the job identifier has succeeded;
   generating a job log according to the content of the job after execution of the job;
   transferring the job log with the job identifier to the external device; and
   canceling the job when judging that the transfer of the log image and the job identifier to the external device has failed.

2. The non-transitory computer readable storage medium according to claim 1, wherein, the transferring of the job log is performed according to a predetermined timing, the predetermined timing is when the job execution is completed.

3. The non-transitory computer readable storage medium according to claim 1, wherein, the transferring of the job log is performed according to a predetermined timing, the predetermined timing is when a manual transfer instruction is accepted.

4. The non-transitory computer readable storage medium according to claim 1, wherein, the transferring of the job log is performed according to a predetermined timing, the predetermined timing is when the image processing device is in a condition in which a load of the image processing device is light.

5. The non-transitory computer readable storage medium according to claim 4, wherein the condition includes at least one of (1) a condition in which no job execution has been performed for a predetermined period, (2) when a power of the image processing device is turned on, and (3) when the image processing device enters a sleep mode.

6. The non-transitory computer readable storage medium according to claim 1, wherein, the transferring of the log image is performed according to a predetermined timing, the predetermined timing is a condition in which a possibility of missing the log image becomes high.

7. The non-transitory computer readable storage medium according to claim 6, wherein the condition includes at least one of (1) when a predetermined number of job logs or a predetermined number of log images is accumulated, (2) when storage capacity of the image processing device used for storing the log image and the job log reaches a predetermined value, and (3) when an operation for deleting the log image and the job log is instructed.

8. The non-transitory computer readable storage medium according to claim 1, wherein, when the log image is created from the image, an amount of information of the image handled in the job to create the log image is reduced by lowering resolution of the image or extracting image to be created as the log image from the image handled in the job.

9. The non-transitory computer readable storage medium according to claim 1, wherein the transfer of the job log and the log image to an external device is performed automatically at a predetermined timing, and the predetermined timing is determined by a user prior to the execution of the job.

10. The non-transitory storage medium according to claim 1, further comprising:
    storing the job log and the log image in a storage device so that the log images are associated with the respective job logs,
    wherein the transfer of the job log and the log image to the external device uses a transfer protocol in accordance with predetermined timing.

11. A non-transitory computer readable storage medium, the storage medium storing a program of instructions executable by the computer to perform a function for controlling a job log, the function comprising:
    inputting an image according to a content of a job;
    issuing a job identifier which corresponds to the job;
    creating a log image by lowering a resolution of the image according to the job;
    transferring the log image and the job identifier to an external device;
    judging whether the transfer of the log image and the job identifier to the external device has succeeded;
    outputting the image in an outputting state according to the job when the transfer of the log image and the job identifier has succeeded;
    generating a job log according to the content of the job after outputting the image;
    transferring the job log with the job identifier to the external device; and
    canceling the job when judging that the transfer of the log image and the job identifier to the external device has failed.

12. The non-transitory computer readable storage medium according to claim 11, wherein the transferring of the created log image to the external device and the transferring of the generated job log to the external device are performed automatically at a predetermined timing, and the predetermined timing is determined by a user prior to the execution of the job.

13. The non-transitory storage medium according to claim 11, further comprising:
    storing the job log and the log image in a storage device so that the log images are associated with the respective job logs,
    wherein the transfer of the job log and the log image to the external device uses a transfer protocol in accordance with predetermined timing.

14. A job log control method comprising:
    inputting an image according to a content of a job;
    issuing a job identifier which corresponds to the job;
    creating a log image by lowering a resolution of the image according to the job;
    transferring the log image and the job identifier to an external device;
    judging whether the transfer of the log image and the job identifier to the external device has succeeded;
    outputting the image in an outputting state according to the job when the transfer of the log image and the job identifier has succeeded;
    generating a job log according to the content of the job after execution of the job;
    transferring the job log with the job identifier to the external device; and
    canceling the job when judging that the transfer of the log image and the job identifier to the external device has failed.

15. The job log control method according to claim 14, wherein the transfer of the job log and the log image to the external device is performed automatically at a predetermined timing, and
the predetermined timing is determined by a user prior to the execution of the job.

16. The job log control method of claim 14, further comprising:
storing the job log and the log image in a storage device so that the log images are associated with the respective job logs,
wherein the transfer of the job log and the log image to the external device uses a transfer protocol in accordance with predetermined timing.

17. A job log control method comprising:
inputting an image according to a content of a job;
issuing a job identifier which corresponds to the job;
creating a log image by lowering a resolution of the image according to the job;
transferring the log image and the job identifier to an external device;
judging whether the transfer of the log image and the job identifier to the external device has succeeded;
outputting the image in an outputting state according to the job when the transfer of the log image and the job identifier has succeeded;
generating a job log according to the content of the job after outputting the image;
transferring the job log with the job identifier to the external device; and
canceling the job when judging that the transfer of the log image and the job identifier to the external device has failed.

18. The job log control method according to claim 17, wherein the transferring of the log image to the external device and the transferring of the generated job log to the external device are performed automatically at a predetermined timing, and
the predetermined timing is determined by a user prior to the execution of the job.

19. The job log control method of claim 17, further comprising:
storing the job log and the log image in a storage device so that the log images are associated with the respective job logs,
wherein the transfer of the job log and the log image to the external device uses a transfer protocol in accordance with predetermined timing.

20. An image processing device comprising:
a job inputting unit that inputs an image according to a content of a job;
a job identifier issuing unit that issues a job identifier that corresponds to the job;
a log image creation unit that creates a log image by lowering a resolution of the image according to the job;
a log image transfer unit that transfers the log image and the job identifier to an external device;
a judging unit that judges whether the transfer of the log image and the job identifier to the external device has succeeded;
an outputting unit that outputs the image in an outputting state according to the job when the transfer of the log image and the job identifier has succeeded;
a job log generating unit that generates a job log according to the content of the job after execution of the job;
a job log transfer unit that transfers the job log with the job identifier to the external device; and
a job canceling unit that cancels the job when judging that the transfer of the log image and the job identifier to the external device has failed.

21. The image processing device according to claim 20, wherein the transfer unit performs transfer of the job log and the log image to the external device automatically at a predetermined timing, and
the predetermined timing is determined by a user prior to the execution of the job.

22. The image processing device according to claim 20, further comprising:
a storage unit that stores the job log and the log image so that the log images are associated with the respective job logs,
wherein the transfer unit transfers the job log and the log image to the external device using a transfer protocol in accordance with predetermined timing.

23. An image processing device comprising:
an image input unit that inputs an image according to a content of a job;
a job identifier issuing unit that issues a job identifier that corresponds to the job;
a log image creation unit that creates a log image by lowering a resolution of the image according to the job;
a log image transfer unit that transfers the log image and the job identifier to an external device;
a judging unit that judges whether the transfer of the log image and the job identifier to the external device has succeeded;
an outputting unit that outputs the image in an outputting state according to the job when the transfer of the log image and the job identifier has succeeded;
a job log generating unit that generates a job log according to the content of the job after outputting the image;
a job log transfer unit that transfers the job log with the job identifier to the external device; and
a canceling unit that cancels the job when judging that the transfer of the log image and the job identifier to the external device has failed.

24. The image processing device according to claim 23, further comprising:
a storage unit that stores the job log and the log image so that the log images are associated with the respective job logs,
wherein the transfer unit transfers the job log and the log image to the external device using a transfer protocol in accordance with predetermined timing.

25. An image processing system comprising:
an image processing device that executes a job; and
a control server connected to the image processing device via a network, wherein
the image processing device includes:
a job inputting unit that inputs an image according to a content of a job;
a job identifier issuing unit that issues a job identifier that corresponds to the job;
a log image creation unit that creates a log image by lowering a resolution of the image according to the job;
a log image transfer unit that transfers the log image and the job identifier to an external device;
a judging unit that judges whether the transfer of the log image and the job identifier to the external device has succeeded;
an outputting unit that outputs the image in an outputting state according to the job when the transfer of the log image and the job identifier has succeeded;

a job log generating unit that generates a job log according to the content of the job after execution of the job;

a job log transfer unit that transfers the job log with the job identifier to the external device; and a job canceling unit that cancels the job when judging that the transfer of the log image and the job identifier to the external device has failed, and wherein the control server includes a storage device that stores the job log and the log image transferred from the transfer unit in association with each other.

26. The image processing system according to claim 25, wherein the transfer unit transfers the job log and the log image to the control server automatically at a predetermined timing, and the predetermined timing is determined by a user prior to the execution of the job.

27. The image processing system according to claim 25, wherein the storage device stores the job log and the log image transferred from the transfer unit so that the log images are associated with the respective job logs, and the transfer unit transfers the job log and the log image to the control server using a transfer protocol in accordance with predetermined timing.

* * * * *